United States Patent
Yamazaki et al.

(10) Patent No.: US 11,103,806 B2
(45) Date of Patent: Aug. 31, 2021

(54) PREPARATIVE SEPARATION-PURIFICATION SYSTEM

(71) Applicant: Shimadzu Corporation, Kyoto (JP)

(72) Inventors: Tomoyuki Yamazaki, Kyoto (JP); Przemyslaw Stasica, Hertfordshire (GB); Bob Boughtflower, Hertfordshire (GB)

(73) Assignee: Shimadzu Corp., Kyoto (JP)

( * ) Notice: Subject to any disclaimer, the term of this patent is extended or adjusted under 35 U.S.C. 154(b) by 15 days.

(21) Appl. No.: 13/874,193

(22) Filed: Apr. 30, 2013

(65) Prior Publication Data
US 2013/0306535 A1  Nov. 21, 2013

(30) Foreign Application Priority Data
May 15, 2012  (JP) ............................. JP2012-111176

(51) Int. Cl.
*B01D 15/22* (2006.01)
*G01N 30/60* (2006.01)

(52) U.S. Cl.
CPC ......... *B01D 15/22* (2013.01); *G01N 30/6004* (2013.01); *G01N 30/6017* (2013.01); *G01N 30/6065* (2013.01)

(58) Field of Classification Search
None
See application file for complete search history.

(56) References Cited

FOREIGN PATENT DOCUMENTS

| EP | 0310867 A2 | 4/1989 | |
|---|---|---|---|
| GB | 2465955 A | 6/2010 | |
| JP | 02-122260 | 5/1990 | |
| JP | 2003-149217 | 5/2003 | |
| JP | 2006-153850 A | 6/2006 | |
| WO | WO-2006116964 A2 * | 11/2006 | .......... B01L 3/50255 |

OTHER PUBLICATIONS

Combined Search and Examination Report for United Kingdom Patent Application No. GB1308616.0 dated Nov. 4, 2013 (5 pages).
Office Action issued in the corresponding Japanese Patent Application No. 2012-111176 dated Jun. 30, 2015 (English translation attached).
Examination Report Received for Chinese Patent Application No. 201310178006.3 dated Oct. 10, 2014, 8 pages (2 pages of English Translation & 6 pages of Official copy).

* cited by examiner

*Primary Examiner* — Kara M Peo
(74) *Attorney, Agent, or Firm* — Chris Mizumoto (57) ABSTRACT

In a preparative separation-purification system for passing a solution containing a target component through a trap column 21 to capture the target component in the column 21, and for subsequently passing an eluting solvent through the column 21 to elute the captured component and collect it in a container, an outlet aperture 27 of the column 21 has a tapered shape whose sectional area is largest on a plane facing an inner space of the column 21 and decreases in the flowing direction of the liquid. A filter 26 for preventing deposition of the target component is also provided at the boundary between the inner space of the column 21 and a passage for discharging liquid from the inner space. By this configuration, clogging of the passage at the outlet end of the column 21 due to deposition of the target component is prevented.

2 Claims, 4 Drawing Sheets

Prior Art

PREPARATIVE SEPARATION-PURIFICATION SYSTEM

TECHNICAL FIELD

The present invention relates to a preparative separation-purification system for separately extracting one or more components from a solution by a liquid chromatograph, and purifying and collecting each of the components. More specifically, it relates to a preparative separation-purification system using a trap column for temporarily capturing a target component.

BACKGROUND ART

Preparative separation-purification systems using liquid chromatographs are used in pharmaceuticals or similar fields in order to collect samples for creating a library of various kinds of chemically synthesized compounds or analyzing the details of such compounds. Conventional examples of preparative separation-purification systems are disclosed in Patent Documents 1 and 2 as well as other documents.

In these apparatuses, target components (compounds) in a sample solution are temporally separated by a liquid chromatograph. The separated target components are introduced into respective trap columns and temporarily captured therein. Subsequently, a solvent is supplied to each trap column to quickly elute the component from the trap column and collect it in a container. Thus, a plurality of solutions, each of which contains one target component at a high concentration, are collected in respective containers. These separately collected solutions are then subjected to a vaporizing and drying process to remove the solvent and collect the target components in solid forms.

In such a preparative separation-purification system, a connecting mechanism using needles and needle ports is adopted to insert each trap column in a passage of liquid. Both the needle and the needle port have an inner passage for allowing the liquid to pass through. A tube for introducing or discharging the liquid is connected to the base end of the needle (i.e. the end opposite from the needle's tip). One needle port is attached to each of the inlet and outlet ends of the trap column. To insert the trap column in the passage of a liquid, one needle having a liquid-introducing tube connected thereto is inserted into the inlet-side needle port, and another needle having a liquid-discharging tube connected thereto is inserted into the outlet-side needle port. As a result, the inner passage of each needle is hermetically connected to that of the counterpart needle port, allowing the liquid to pass through the trap column.

Figure 5:
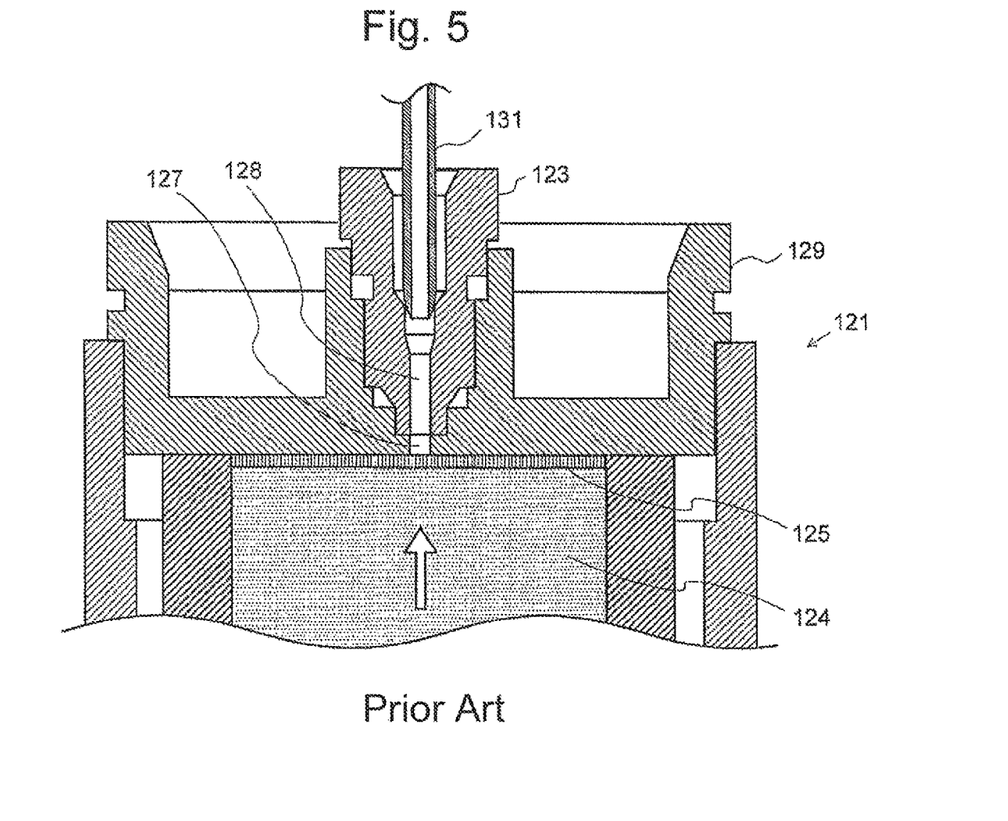
FIG. 5 is a sectional view of a portion around the outlet end of a trap column used in a conventional preparative separation-purification system.

FIG. 5 shows a section of a trap column used in a conventional preparative separation-purification system. For simplification, FIG. 5 shows only the portion around the outlet end of the trap column. The inlet portion also has basically the same construction.

The trap column 121 is shaped like a hollow cylinder with an inner space 124 packed with grains of filler. A mesh cap 125 for preventing an outflow of the filler while allowing the dispersion of the liquid is attached to the end of the trap column 121 with a lid 129. The lid 129 has an aperture 127 for allowing the passage of liquid. A cavity is formed on the outside of the aperture 127, and a needle port 123 is fitted in this cavity. When the needle port 123 is fitted in the cavity, the passage inside the needle port 123 (which is hereinafter called the inner port passage 128) is connected to the aperture 127. In this state, a liquid passing through the trap column 121 flows through the aperture 127 into the inner port passage 128, and further flows through the passage inside the needle 131, to be eventually sent into a liquid-discharging tube (not shown).

BACKGROUND ART DOCUMENT

Patent Document

Patent Document 1: JP-A 142-122260
Patent Document 2: JP-A 2003-149217

SUMMARY OF THE INVENTION

Problem to be Solved by the Invention

However, when the target component temporarily captured in the trap column in the aforementioned manner is eluted at a high concentration, the target component will easily leave deposits within the passage. This problem is particularly noticeable in the area around the outlet of the trap column, since the solvent that has passed through the filler-containing space 124 is likely to stand still at the aperture where the diameter of the passage suddenly decreases, as shown in FIG. 5. If the target component is a type of compound that easily leaves deposits, the passage at the aforementioned portion will be clogged because of the deposition of the target component, thus impeding the flow of the eluate (i.e. the solvent containing the target component) from the trap column.

The present invention has been developed in view of the aforementioned problem. Its objective is to provide a preparative separation-purification system capable of effectively preventing clogging of a passage due to the deposition of a target component eluted from a trap column, and particularly the clogging of the passage at the outlet end of the same column.

Means for Solving the Problems

A first aspect of the present invention aimed at solving the aforementioned problem is a preparative separation-purification system for passing a solution containing a target component through a trap column to capture the target component in the trap column, and for subsequently passing an eluting solvent through the trap column to elute the target component captured in the trap column and collect the eluted component in a collection container, wherein:

the trap column has an aperture at one end thereof serving as an inlet for a liquid and an aperture at the other end serving as an outlet for the liquid; and the aperture serving as the outlet has a tapered portion whose sectional area is largest on a plane facing an inner space of the trap column and decreases in a flowing direction of the liquid.

In the preparative separation-purification system according to the first aspect of the present invention, the tapered portion is designed to form a liquid-passage area whose diameter gradually decreases toward the outlet end of the trap column. As compared to the conventional trap column shown in FIG. 5, in which the diameter of the liquid-passage area suddenly decreases at the outlet end of the column, the present system more effectively prevents the liquid from standing still around the outlet area, so that the target component is less likely to leave a deposit at the outlet end of the trap column.

A second aspect of the present invention aimed at solving the aforementioned problem is a preparative separation-purification system for passing a solution containing a target component through a trap column to capture the target component in the trap column, and for subsequently passing an eluting solvent through the trap column to elute the target component captured in the trap column and collect the eluted component in a collection container, wherein:

a filter for preventing deposition of the target component is provided at the boundary between an inner space of the trap column and a passage for discharging a liquid from the inner space.

In the preparative separation-purification system according to the second aspect of the present invention, even if the target component eluted from the trap column crystallizes in the eluate, the growth of the crystal is impeded by passing the eluate through the filter, whereby the clogging of the passage at the outlet end of the column is prevented.

As already noted, the trap column used in a preparative separation-purification system may be provided with a mesh cap for preventing an outflow of the filler at each end of the inner space of the column. In such a case, the aforementioned filter for preventing deposition of the target component should be located on the outside of the mesh cap, i.e. on the downstream side in the flowing direction of the liquid.

Thus, in one mode of the preparative separation-purification system according to the second aspect of the present invention, the trap column has a mesh cap provided at the aforementioned boundary for preventing an outflow of a filler, and the filter for preventing deposition of the target component is located on the downstream side of the cap in the flowing direction of the liquid.

The preparative separation-purification system according to the present invention may preferably include both the tapered portion and the filter for preventing deposition of the target component. By this configuration, the deposition of the target component at the outlet end of the trap column will be more effectively prevented.

Although the preparative separation-purification system according to the present invention may be configured so that a solution which has been prepared beforehand by an appropriate device (e.g. a fraction collector of a preparative liquid chromatograph) so as to contain a target component is supplied to the trap column, it may also be directly coupled with a liquid chromatograph to construct an "on-line" trapping system. That is to say, the present system may be configured so that a liquid sample is carried by a predetermined mobile phase into a separation column of a liquid chromatograph and an eluate from the separation column is supplied to the trap column to capture the target component contained in the eluate in the same trap column.

Effect of the Invention

As described thus far, in the preparative separation-purification system according to the present invention, clogging of the passage due to a target component depositing at the outlet end of the trap column after being eluted from the same trap column is effectively prevented.

BEST MODE FOR CARRYING OUT THE INVENTION

Figure 1:
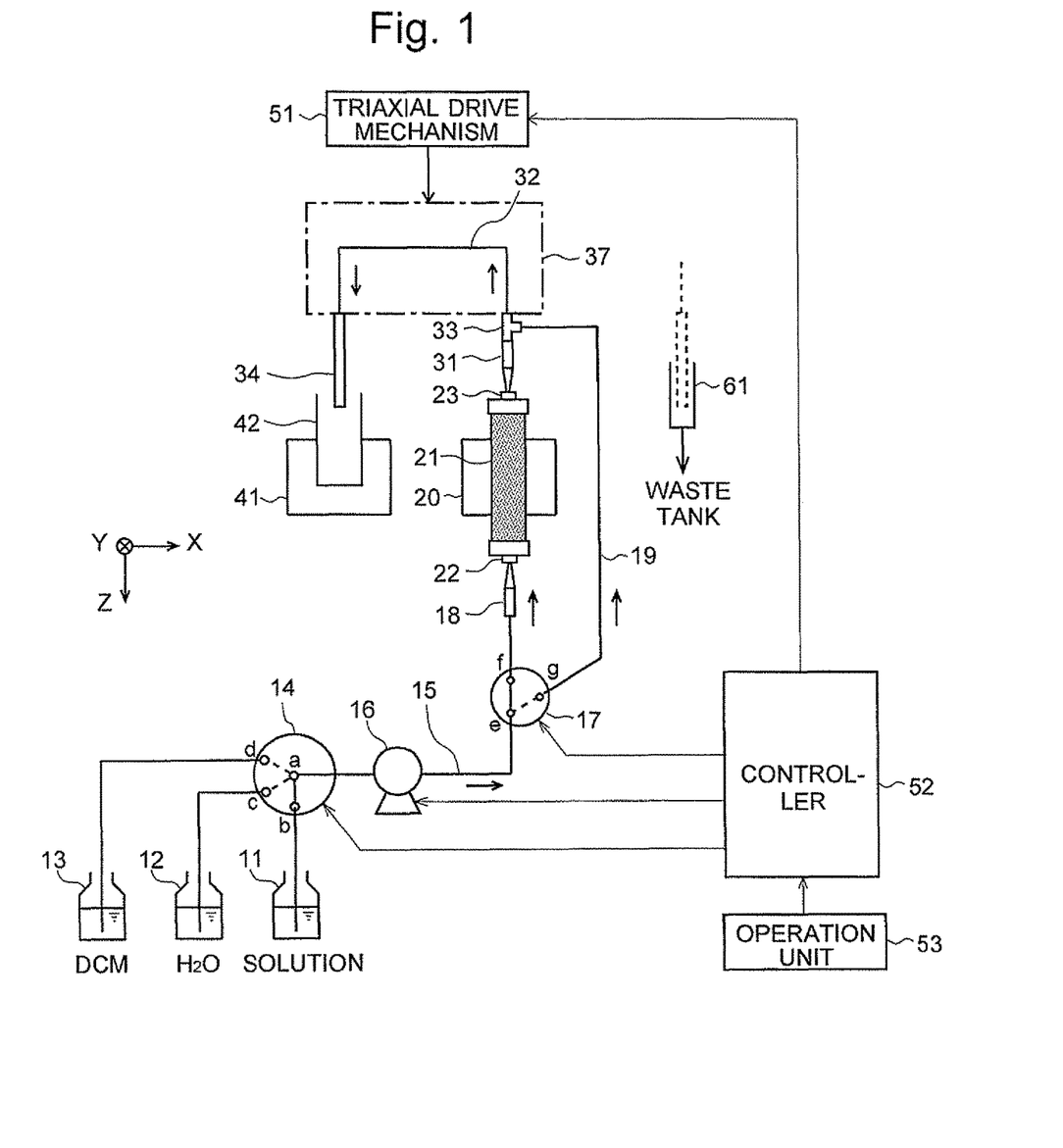
FIG. 1 is a schematic configuration diagram of a preparative separation-purification system according to one embodiment of the present invention.

Modes for carrying out the present invention will be hereinafter described by means of embodiments. FIG. 1 is a schematic configuration diagram of a preparative separation-purification system according to one embodiment of the present invention. The present system is designed for purifying a target component contained in a solution prepared by a preparative liquid chromatograph (not shown) and collecting the purified component in solid forms. It is also possible to modify the configuration to an "on-line" system in which a preparative liquid chromatograph is directly connected to the system to directly introduce a solution containing various components separated by the liquid chromatograph.

In FIG. 1, a solution container 11 holds a fraction of solution prepared beforehand in the aforementioned manner. This solution contains a target component dissolved in a solvent which is mainly composed of a mobile phase used in the preparative liquid chromatograph. A wash liquid container 12 holds pure water to be used for washing a column. A solvent container 13 holds dichloromethane (represented as "DCM" in FIG. 1) to be used as both a solvent used for eluting the target component (the eluting solvent) and a liquid for diluting an eluate exiting from the column. A first selector valve 14, which is a three-way selector valve, is used for changing the passage configuration to selectively draw a liquid from one of the three containers 11, 12 and 13 and send it to a supply passage 15. The first selector valve 14 has three inlet ports b, c and d, with three tubes respectively connected thereto so as to draw one of the three liquids held in the solution container 11, the wash liquid container 12 and the solvent container 13. The first selector valve 14 also has an outlet port a, to which one end of the aforementioned supply passage 15 is connected. The other end of the supply passage 15 is connected to the base end of a first needle 18, which consists of a cylindrical needle with a pointed tip. A liquid-sending pump 16 for drawing and sending liquid at a predetermined flow rate is provided in the supply passage 15. A second selector valve 17, which is a two-way selector valve, is provided between the pump 16 and the first needle 18. (The configuration and operation of this valve will be described later.)

A column rack 20 holds a plurality of trap columns 21 arranged in the direction perpendicular to the drawings sheet (i.e. the Y-direction in FIG. 1). Each trap column 21 is packed with grains of filler for capturing a target component. On the column rack 20, each trap column 21 is almost vertically held, with the inlet end directed downward, to which the supply passage 15 is to be connected, and the outlet end directed upward, to which a collection passage 32 is to be connected.

One end of the collection passage 32, which a liquid exiting from the trap column 21 passes through, is connected to the base end of a second needle 31 consisting of a cylindrical needle with a pointed tip. The other end of the collection passage 32 is connected to the base end of a cylindrical ejection nozzle 34.

A plurality of collection containers 42 for collecting separated and purified target components are held in a container rack 41 and arranged at intervals corresponding to the trap columns 21 in the direction perpendicular to the drawings sheet. An amount of liquid ejected from the tip of the ejection nozzle 34 is dropped into one of these collection containers 42.

The collection passage 32, the second needle 31 and the ejection nozzle 34 are attached to a fraction collector head 37, which can be moved vertically (i.e. in the Z-direction in FIG. 1) as well as horizontally (i.e. in the X and Y directions in FIG. 1) by means of a triaxial drive mechanism 51. By horizontally moving the fraction collector head 37, the second needle 31 can be moved to a position directly above any one of the trap columns 21 held in the column rack 20. This operation simultaneously brings the ejection nozzle 34 to a position directly above one collection container 42 held at the position in the container rack 41 corresponding to the aforementioned one of the trap columns 21. From this position, the fraction collector head 37 can be lowered to a level where the second needle 31 is inserted into the needle port 23 at the outlet end of the selected trap column 21 to connect the collection passage 32 to that outlet end. This operation also lowers the ejection nozzle 34 in the selected collection container 42 to a position where liquid can be dropped from the tip of the ejection nozzle 34 into that collection container 42. A disposal port 61 having a receiver and a disposal passage leading to a waste tank (not shown) is also placed within a range over which the fraction collector head 37 can be moved by the triaxial drive mechanism 51.

The first needle 18 can also be moved vertically and horizontally by another drive mechanism (not shown). By using this mechanism, the first needle 18 can be moved horizontally to a position directly below one of the trap columns 21 held in the column rack 20 and then upward to a level where the needle 18 is inserted into the needle port 22 at the inlet end of the selected trap column 21 to connect the supply passage 15 to the inlet end of the same column 21.

A dilution passage 19 is connected to the second selector valve 17 provided in the supply passage 15. The second selector valve 17 is used for selectively directing the liquid drawn by the liquid-sending pump 16 to either the trap column 21 or the dilution passage 19. It has three ports e, f and g. A tube extending from the pump 16 (i.e. the upstream portion of the supply passage 15) is connected to port e; a tube leading to the first needle 18 (i.e. the downstream portion of the supply passage 15) is connected to port f; and one end of the dilution passage 19 is connected to port g. The other end of the dilution passage 19 is connected to the collection passage 32 via a T-joint 33 provided near the second needle 31, whereby a liquid flowing through the dilution passage 19 (i.e. the diluting liquid) can be introduced into the collection passage 32.

A controller 52, including a central processing unit (CPU) and other elements, automatically conducts the preparative separation-purification process by performing the setting of the switching operations of the first and second selector valves 14 and 17, the operation of the liquid-sending pump 16 (e.g. the flow rate or flow velocity) as well as the driving operation of the triaxial drive mechanism 51, according to a predetermined program. An operation unit 53 allows users to enter or set conditions for the preparative separation-purification process and other information.

Figure 2:
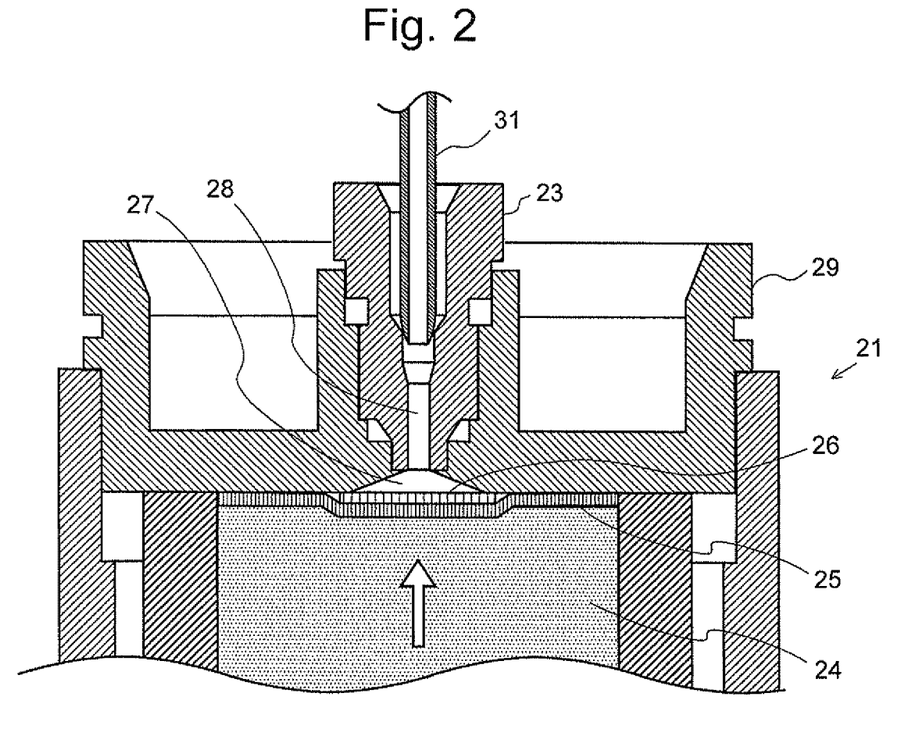
FIG. 2 is a sectional view of a portion around the outlet end of a trap column used in the preparative separation-purification system of the embodiment.

The configuration of the trap column 21, which characterizes the present invention, is hereinafter described in detail. FIG. 2 is an enlarged sectional view showing the configuration of the outlet portion of the trap column 21 used in the present embodiment. The trap column 21 has an inner space for containing a filler for capturing a target component (this space is hereinafter called the filler-containing area 24). At the end of the filler-containing area 24, a lid 29 having an aperture 27 for allowing the passage of liquid is attached, with a cavity formed on the outside of the aperture 27. The needle port 23 is fitted in this cavity, whereby the aperture 27 is connected to the passage formed in the needle port 23 (this passage is hereinafter called the inner port passage 28).

The trap column 21 in the present embodiment is characterized in that the aperture 27 has a tapered shape whose sectional area gradually decreases in the flowing direction of the liquid (which is indicated by the arrow in FIG. 2). The inner diameter of the aperture 27 is 6 mm on the upstream side and 0.8 mm on the downstream side. The filler-containing area 24 located on the upstream side of the aperture 27 has an inner diameter of 20 mm, while the inner port passage 28 located on the downstream side of the aperture 27 has an inner diameter of 0.8 mm. Thus, the trap column 21 in the present embodiment is designed so that the diameter of the area which the liquid introduced into the column 21 passes through after exiting the filler-containing area 24 gradually decreases. As compared to the conventional trap column 121 shown in FIG. 5, in which the area that the liquid passes through after exiting the filler-containing area (i.e. the inner space 124) is suddenly reduced to substantially the same diameter as that of the inner port passage 128, the present trap column 21 is less likely to allow the liquid to stand still in the aforementioned area, and the deposition of the target component at the outlet end of the trap column 21 is less likely to occur.

Another characteristic element of the trap column 21 in the present embodiment is the filter provided between the filler-containing area 24 and the aperture 27 for preventing deposition of target components (this filter is hereinafter called the deposition-preventing filter 26). The deposition-preventing filter 26 is located on the outside (the downstream side) of a mesh cap 25 attached to the outlet end of the filler-containing area 24. This cap 25 is a conventionally used element provided at both ends of the filler-containing area 24 to prevent an outflow of the filler as well as disperse the liquid. The deposition-preventing filter 26 is a Nylon Net Filter with a pore size of 20 μm (a product of EMD MILLIPORE® Corporation, product code: NY2004700). The cap 25 is a stainless mesh filter with a pore size of 2 μm.

Even if a target component eluted from the filler by the eluting solvent leaves a deposit and crystallizes immediately after exiting the filler-containing area 24, the deposition-preventing filter 26 on the downstream side of the filler-containing area 24 suppresses the growth of crystals of the target component and thereby prevents the clogging of the passage.

An operation of the automatic preparative separation-precipitation by the preparative separation-precipitation system of the present embodiment is hereinafter described. Initially, to capture a target component on the grains of the filler in the trap column 21, the controller 52 changes the passage configuration so as to connect the solution container 11 (port b) and the supply passage 15 (port a) by the first selector valve 14 as well as the supply passage 15 (port e) and the first needle 18 (port f) by the second selector valve 17, and energizes the liquid-sending pump 16 to send the solution at a constant flow rate. Prior to this operation, the first needle 18 is connected to the needle port 22 at the inlet end of a desired trap column 21, the second needle 31 is connected to the needle port 23 at the outlet of the same trap column 21, and the ejection nozzle 34 is inserted into the disposal port 61.

The liquid-sending pump 16 draws the solution from the solution container 11 and sends it into the trap column 21 through its inlet end. Then, the target component in the solution is captured onto the grains of the filler in the trap column 21. The mobile phase from which the target component has been removed exits from the outlet end, to be discharged through the collection passage 32 and the ejection nozzle 34 into the disposal port 61.

After the solution is supplied to the trap column 21 for a predetermined period of time or until the solution prepared in the solution container 11 is used up, the controller 52 switches the first selector valve 14 to connect the wash liquid container 12 (port c) and the supply passage 15 (port a). Then, the liquid-sending pump 16 draws pure water from the wash liquid container 12 and sends it into the trap column 21 through its inlet end. As a result, unwanted water-soluble substances, such as salt that has adhered to the grains of the filler during the process of capturing the target component, are removed from the trap column 21, to be discharged through the collection passage 32 and the ejection nozzle 34 into the disposal port 61. By this supply of pure water, the mobile phase remaining inside the trap column 21 immediately before the beginning of the supply of water is replaced by the water, and the trap column 21 becomes filled with water. The target component captured on the grains of the filler is strongly adsorbed and barely eluted into the water. Therefore, at this point, the target component remains in the captured state within the trap column 21.

Subsequently, the controller 52 switches the first selector valve 14 to connect the solvent container 13 (port d) and the supply passage 15 (port a). Then, the liquid-supply pump 16 begins to draw the eluting solvent (dichloromethane) and introduce it into the trap column 21 through its inlet end.

When the eluting solvent is supplied to the trap column 21, the target component captured on the grains of the filler is eluted into the solvent. Accordingly, the controller 52 calculates the period of time t1 required for completely removing the water, based on the void volume in the trap column 21 (i.e. the volume of water remaining in the trap column 21 immediately before the introduction of dichloromethane begins) and the flow rate of dichloromethane supplied by the pump 16. When the period of time t1 has elapsed, the ejection nozzle 34 is removed from the disposal port 61 and inserted into a predetermined collection container 42 to begin preparative separation of the target component. In this state, the eluate containing the target component flows through the collection passage 32, to be eventually dropped from the ejection nozzle 34 into the selected collection container 42.

After the eluting solvent begins to be discharged from the outlet end of the trap column 21, an eluate containing the target component at a high concentration almost simultaneously begins to flow in the collection passage 32 since dichloromethane has a strong eluting power. In conventional systems, this situation is likely to lead to deposition of the target component within the passage and the consequent clogging of a tube or valve, which impedes the flow of the eluate. By contrast, in the system of the present embodiment, since the aperture 27 has a tapered shape at the outlet end of the trap column 21 and the deposition-preventing filter 26 is provided on the upstream side of the aperture 27, deposition of the target component at the outlet end of the trap column 21 barely occurs. Thus, the clogging of the passage at the outlet end is prevented.

In the system of the present embodiment, it is also possible to prevent clogging of the passage in the areas downstream from the outlet end of the trap column 21 by diluting the eluate in the collection passage 32 with the liquid supplied through the dilution passage 19. That is to say, under the command of the controller 52, the second selector valve 17 can be intermittently switched from the first needle 18 (port f) to the dilution passage 19 (port g) for a predetermined period of time after the eluting solvent begins to be discharged from the outlet end of the trap column 21. While the second selector valve 17 is switched to the dilution passage 19, the dichloromethane sucked by the pump 16 is directly sent into the collection passage 32 without passing through the trap column 21.

By this operation, the eluate containing the target component at a high concentration is diluted by the diluting liquid, so that deposition of the target component in the collection passage 32 is less likely to occur. Thus, in the present embodiment, the dichloromethane contained in the solvent container 13 serves not only as a solvent for eluting the target component from the trap column 21 but also as a liquid for diluting the eluate in the collection passage 32.

When intermittently introducing the diluting liquid in the previously described manner, the eluate from the trap column 21 (dichloromethane with the target component contained therein) and the diluting liquid introduced from the dilution passage 19 (dichloromethane with no target component contained therein) alternately flow in the collection passage 32. Therefore, even if the target component in the eluate leaves deposits on and sticks to the tube or valve while the eluate is flowing through the collection passage 32, the deposited compound will be dissolved in the subsequently supplied diluting liquid, whereby clogging of the passage is effectively prevented.

For the aforementioned intermittent supply of the diluting liquid, users can previously set a desired interval of supplying the diluting liquid and a desired length of time for one cycle of the supply of the liquid. Increasing the ratio of the supply amount of the diluting liquid to that of the eluting solvent improves the effect of preventing the deposition of the target component. However, it also increases the length of time required for drying the target component since a larger amount of diluting liquid will be mixed in the eluate collected in the collection container 42. Accordingly, it is desirable to reduce the supply amount of the diluting liquid as much as possible within the range where clogging of the passage will not occur.

Since the amount of target component captured by the filler in the trap column 21 is limited, the concentration of the target component contained in the eluate decreases after a certain period of time from the beginning of the introduction of dichloromethane into the trap column 21. Accordingly, when a predetermined period of time has elapsed from the beginning of the preparative separation process, or when a predetermined amount of dichloromethane has been supplied, the controller 52 removes the ejection nozzle 34 from the collection container 42 and places it back into the disposal port 61. Thus, the preparative separation process is completed.

In the case where the preparative separation-purification process using another trap column on the column rack 20 is to be performed, the fraction collector head 37 is moved by the triaxial drive mechanism 51 to connect the second needle 31 to the outlet end of the next trap column, and simultaneously, the ejection nozzle 34 is inserted into the next collection container. The first needle 18 is also moved by another drive mechanism (not shown) so as to be connected to the inlet end of the aforementioned next trap column. After the solution container 11 is replaced with a new one holding a different solution (which contains a target component to be separated and purified the next time), the previously described preparative separation-purification process is similarly performed. Instead of letting users manually replace solution containers 11, the system may include a mechanism for changing the passage configuration so as to automatically connect another solution container to the supply passage 15. Such a mechanism can be easily created by adding a passage selector valve.

After the fractions of eluate containing different target components have been collected in the respective collection containers 42, the target components can be extracted in solid forms by heating the eluate or centrifuging it under a vacuum.

It should be noted that the previous embodiment is a mere example of the present invention. Any change, modification or addition appropriately made within the spirit of the present invention will evidently fall within the scope of claims of the present patent application.

For example, although the preparative separation-purification system of the previous embodiment has adopted both the tapered shape of the aperture 27 for discharging liquid from the trap column 21 and the deposition-preventing filter 26 between the filler-containing area 24 of the trap column 21 and the aperture 27, it is possible to adopt only one of these two features.

Figure 4:
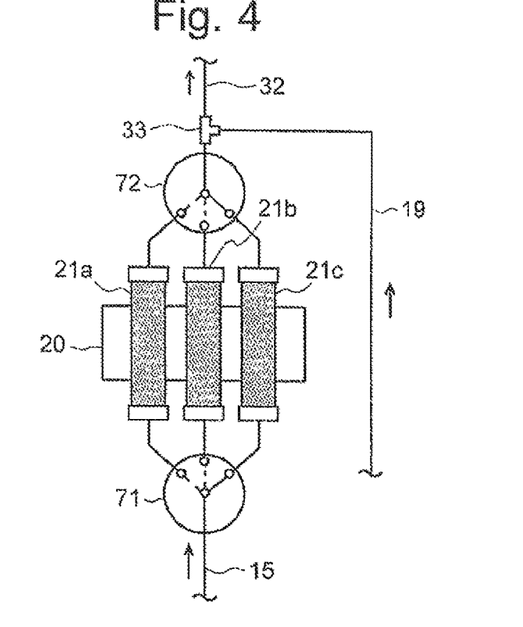
FIG. 4 is a schematic diagram showing another example of the connecting mechanism between an external passage and the trap columns used in the present invention.

Although the system according to the previous embodiment used the connecting mechanism having needles and needle ports to connect each trap column 21 to external passages (the supply passage 15 and the collection passage 32), it is possible to use a different type of connecting mechanism. One specific example is shown in FIG. 4, in which a plurality of trap columns 21a, 21b and 21c are arranged parallel to each other, with tubes directly connected to the inlet and outlet ends of these trap columns, each tube having the other end connected to a selector valve 71 or 72 so that one of the trap columns can be selectively connected to the supply passage 15 and the collection passage 32 by switching the valves 71 and 72. Even in the case of adopting this mechanism, it is possible, as in the previous embodiment, to merge the dilution passage 19 with the collection passage 32, to give a tapered shape to the aperture for discharging liquid from the trap column 21a, 21b or 21c, and to provide the deposition-preventing filter at the inlet of this aperture to prevent deposition of a target component on the downstream side of the trap column.

Figure 3:
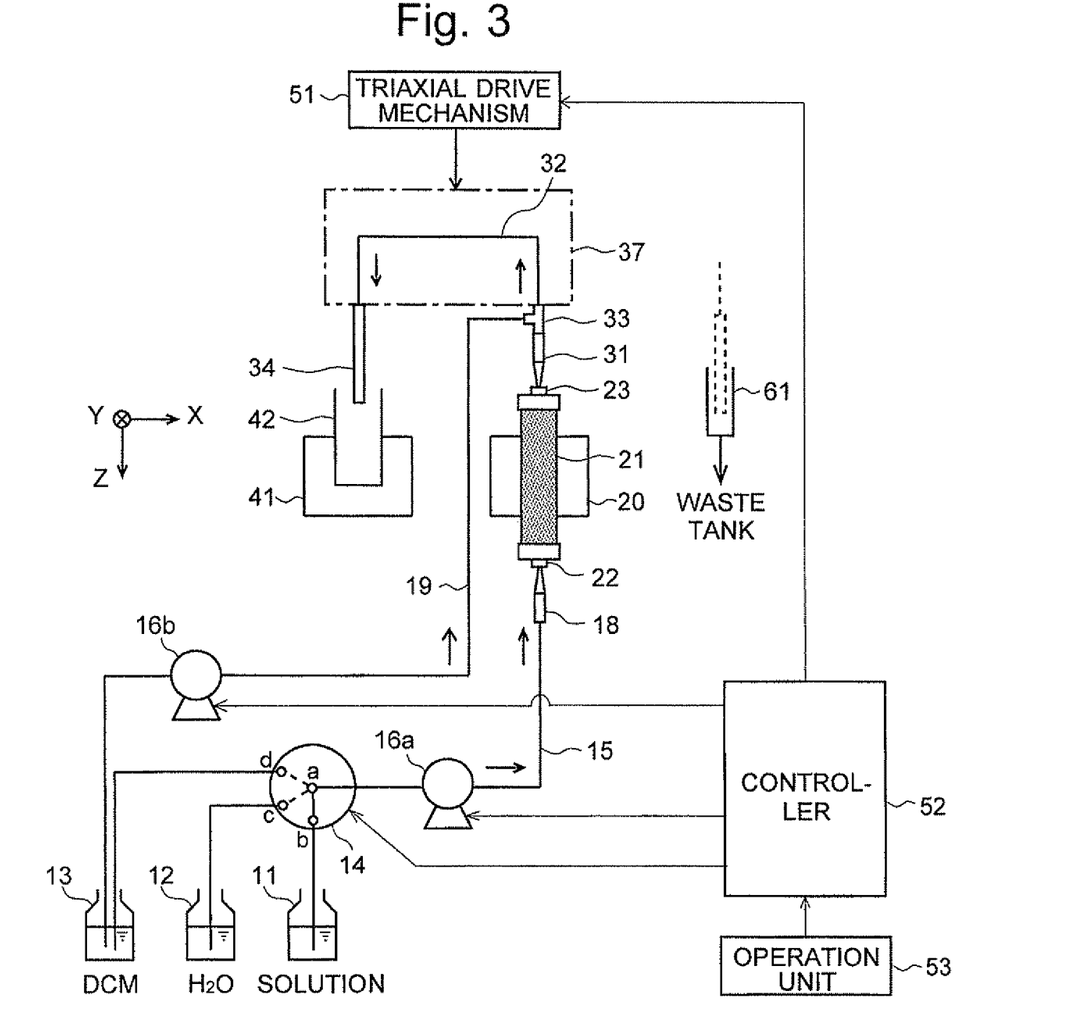
FIG. 3 is a schematic configuration diagram of another embodiment of the preparative separation-purification system according to the present invention.

The preparative separation-purification system of the previous embodiment used only one liquid-sending pump 16 and one selector valve 17 to perform both the supply of the eluting solvent to the trap column 21 and the supply of the diluting liquid to the dilution passage 19. However, this is not the only possible configuration. Another example is shown in FIG. 3, in which a liquid-sending pump 16b for sending a diluting liquid to the dilution passage 19 is provided in addition to the liquid-sending pump 16a for supplying a liquid to the trap column 21, and the controller 52 alternately energize these pumps 16a and 16b during the process of preparative separation of the target component. Furthermore, unlike the examples of FIG. 1 or 3 in which the same kind of liquid (dichloromethane) is used as both the eluting solvent and the diluting liquid and supplied from the same container 13, it is possible to hold the eluting solvent and the diluting liquid in separate containers and/or use different kinds of liquids as the eluting solvent and the diluting liquid.

EXPLANATION OF NUMERALS

11 . . . Solution Container
12 . . . Wash-Liquid Container
13 . . . Solvent Container
14 . . . First Selector Valve
15 . . . Supply Passage
16 . . . Liquid-Sending Pump
17 . . . Second Selector Valve
18 . . . First Needle
19 . . . Dilution Passage
21 . . . Trap Column
22, 23 . . . Needle Port
24 . . . Filler-Containing Area
25 . . . Cap
26 . . . Deposition-Preventing Filter
27 . . . Aperture
28 . . . Inner Port Passage
29 . . . Lid
31 . . . Second Needle
32 . . . Collection Passage
34 . . . Ejection Nozzle
37 . . . Fraction Collector Head
42 . . . Collection Container
51 . . . Triaxial Drive Mechanism
52 . . . Controller
61 . . . Disposal Port

The invention claimed is:

1. A preparative separation-purification system for passing a solution containing a target component, comprising:
   a trap column, being a hollow cylinder with an inner space packed with a filler, to capture the target component and then to pass an eluting solvent therethrough to elute the target component captured in the trap column; and
   a collection container to collect the eluted component, wherein:
   the trap column includes:
   a first end for an inlet for a liquid and a second end for an outlet for the liquid;
   a lid having an aperture serving as the outlet is attached to the second end of the trap column, wherein the aperture is formed in a middle of the lid and has a tapered portion whose sectional area is largest on a plane facing the inner space of the trap column and decreases in a flowing direction of the liquid, and a surface of the lid surrounding the aperture with the tapered portion and facing the inner space is flat and parallel to a section of the second end of the trap column;
   a mesh cap provided at a boundary of the inner space of the trap column for preventing an outflow of the filler; and
   a filter for preventing deposition of the target component and which is disposed between the mesh cap and the aperture formed in the lid, wherein an outer edge of the filter is in contact with the surface of the lid.

2. A preparative separation-purification system for passing a solution containing a target component through a trap column to capture the target component in the trap column, and for subsequently passing an eluting solvent through the trap column to elute the target component captured in the trap column and collect the eluted component in a collection container, wherein:

the trap column, being a hollow cylinder with an inner space packed with a filler, includes:

a first end for an inlet for a liquid and a second end for an outlet for the liquid;

a lid having an aperture serving as the outlet is attached to the second end of the trap column, wherein the aperture is formed in a middle of the lid and has a tapered portion whose sectional area is largest on a plane facing the inner space of the trap column and decreases in a flowing direction of the liquid, and a surface of the lid surrounding the aperture with the tapered portion and facing the inner space is flat and parallel to a section of the second end of the trap column; and a mesh cap provided at a boundary of the inner space of the trap column for preventing an outflow of the filler; and a filter for preventing deposition of the target component and which is disposed between the mesh cap and the aperture formed in the lid, wherein an outer edge of the filter is in contact with the surface of the lid.

\* \* \* \* \*